Patented Sept. 8, 1936

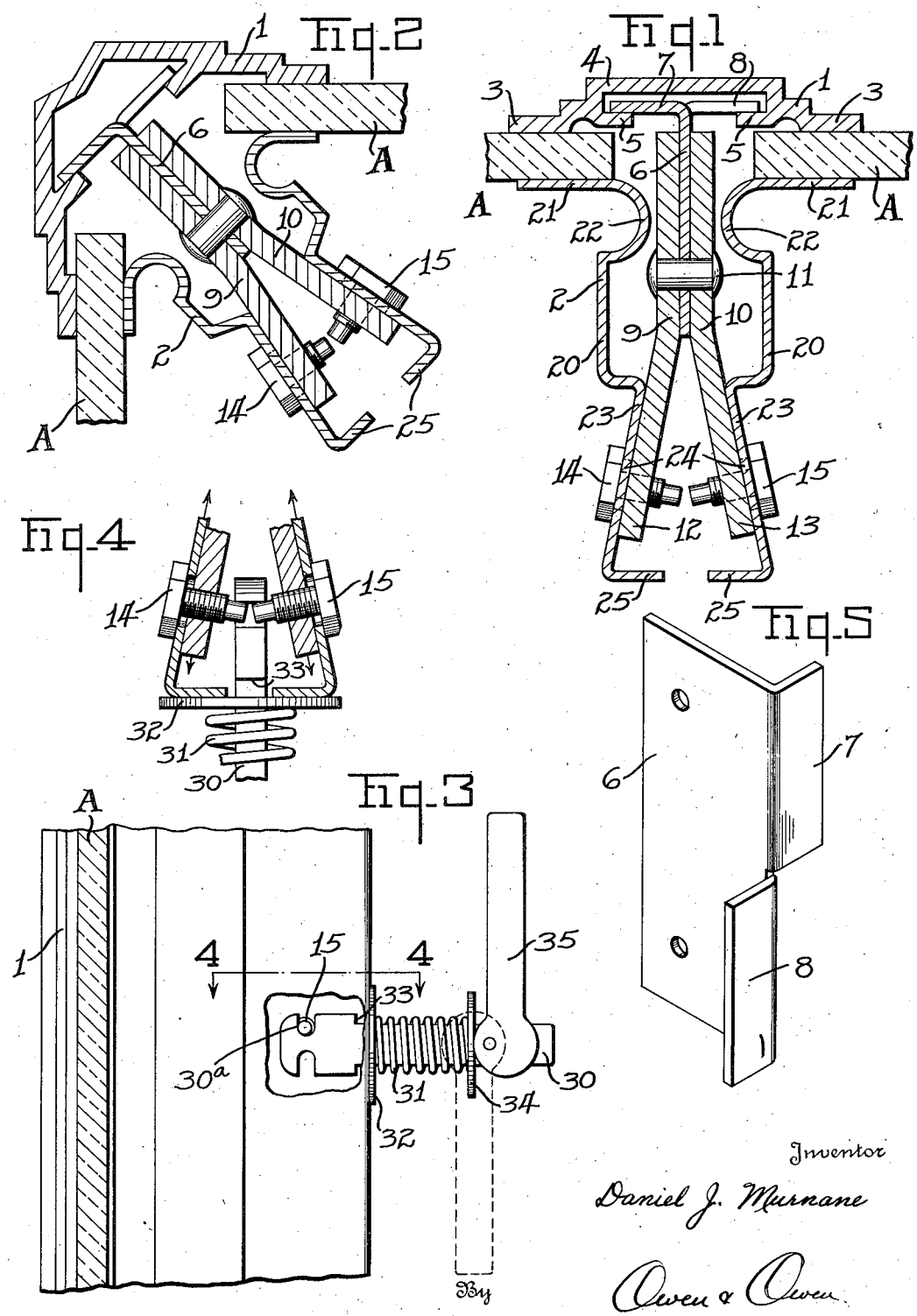

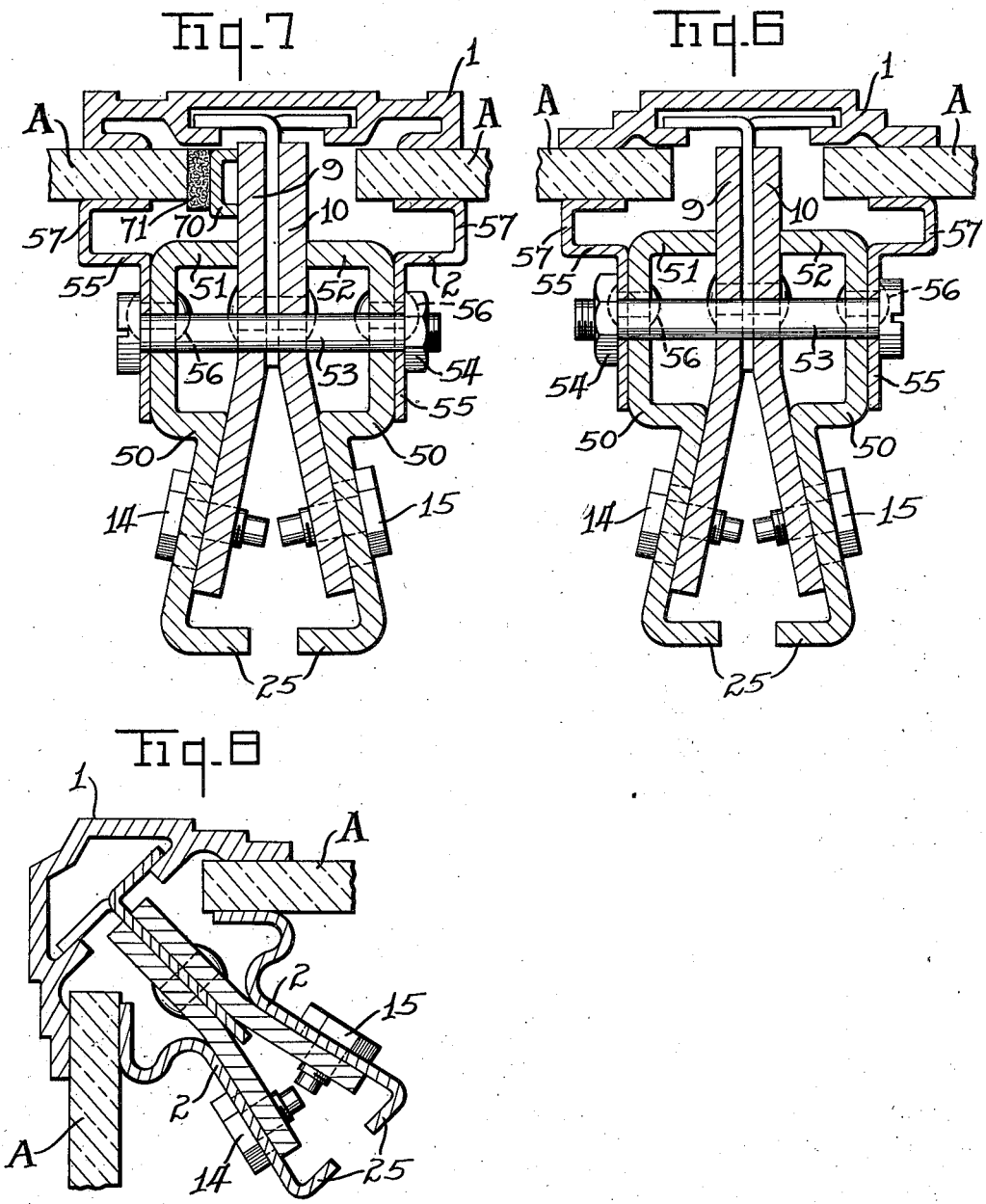

2,053,374

UNITED STATES PATENT OFFICE 2,053,374

PLATE GLASS HOLDING DEVICE

Daniel J. Murnane, West Hollywood, Calif.

Application November 16, 1934, Serial No. 753,288

2 Claims. (Cl. 189—78)

This invention relates to bar structures for holding the adjacent edges of two plates of glass in store fronts and the like, either at corners or where both plates lie in the same plane.

The present invention constitutes an improvement of the construction disclosed in my Patent Number 1,893,713, dated January 10, 1933. In the structure there disclosed, the outer glass engaging member comprises a T section of metal which is preferably extruded for its superior appearance, the stem portion of the T being tapered to provide wedge surfaces capable of engagement with the inner glass holding member to retain the two parts against relative displacement.

It has been found that the expense of manufacture, ease and efficiency of operation, and simplicity of setting can all be improved by providing a resilient bracket interposed between the inner and outer glass contacting members, and by replacing the stem part of the above mentioned T section with a divided stem part made of inexpensive metal.

It is the object of the present invention, therefore, to provide a plate glass holding bar having a resilient connection between inner and outer glass contacting members which are relatively movable and adjustable, but which, when set, are positively held against displacement.

A further object of the invention is the provision of a glass holding means of this character which is inexpensive of manufacture, and capable of easy and efficient operation.

Other objects and advantages of the invention will become apparent as the description proceeds, reference being had to the accompanying drawings in which, Figure 1 is a horizontal cross-sectional view to an enlarged scale of one form of the device as applied to panes of glass lying in the same plane; Fig. 2 is a similar view of a corner bar structure; Fig. 3 is a side elevation of a division bar and the pressure tool for setting the same with parts broken away to show the application of the tool; Fig. 4 is a section on line 4—4 of Fig. 3; Fig. 5 is a perspective view of the resilient bracket; Fig. 6 is a section of a modified form of division bar; Fig. 7 is a vertical section showing the application of a bar of the type disclosed in Fig. 6 to panes of glass vertically spaced from each other in the same plane, and Fig. 8 is a view similar to Fig. 2, showing a modified form of corner bar.

Referring to the drawings and particularly to Fig. 1, the division bar comprises an outer glass contacting member 1, and an inner glass contacting member 2, connected and supported in a manner hereinafter described. Both the inner and outer glass contacting members are continuous throughout the length of the panes of glass, designated by A, which are to be held.

The outer member 1 is preferably made of extruded metal, as this gives a better appearance to the completed front. In the preferred form this member is provided with extended contact surfaces 3 and an offset central portion 4. Within the space formed by the offset, similar inwardly projecting flanges 5 are provided.

The connecting means, according to the present invention, comprises resilient brackets, as shown in Fig. 5, spaced at intervals along the length of the bar. In the form shown, the brackets include a main stem portion 6 from which are bent opposite bar engaging flanges 7 and 8, disposed at right angles to the main part 6. Obviously any other T shape would be suitable. Cooperating with the resilient brackets to complete the connecting means, are plates 9 and 10 having parallel faces engaging the stem part of the brackets and fixed thereto as by rivets 11 or any other suitable means. The inner ends of the plates are made divergent to form leg portions 12 and 13 spaced apart for the reception of screws 14 and 15 by which the plates are held to the inner glass holding members to complete the connection.

The inner glass holding members in this instance comprise continuous metallic strips 20 having outwardly disposed glass contacting portions, or legs, 21 which are connected by rounded parts 22 to the rearwardly extending body part. Inwardly offset from the body part and disposed in planes coincident with the leg portions 12 and 13 of the connecting plates, are holding faces 23. These faces are adapted to be brought into tight frictional engagement with the connecting plates by the headed screws 14 and 15, the shanks of which are received in slots 24 and threaded into the connecting plate. The extreme inner end of each of the screws is reduced to the root diameter of the threaded shank for a purpose which will presently become apparent. At their extreme inner ends, the inner glass holding members are bent to form flat faces 25.

In making an installation of the bar structure, the brackets are first placed loosely in the outer glass holding member which is then moved into position against the two panes of glass. The inner glass holding members are then placed against the glass with the glass engaging legs 21 in light contact. The brackets are then moved to the proper position so that screws 14 and 15 may be inserted through the slots in the inner members and threaded into the connecting plates. To assist in moving the inner glass contacting faces against the glass after the screws have been inserted, but before they have been tightened down against the holding faces 23, a wedging tool may be inserted between the connecting plate to urge the inner members against the glass. While the invention is not limited to any particular tool for performing this function, a suitable tool is shown in Figs. 3 and 4. The tool comprises a stem 30 having a jaw 30a on its inner end adapted to engage the smooth part of the screws 14 and 15. Surrounding the stem 30 is a coil spring 31 bearing against a plate 32 through which the stem is inserted, the movement of the plate being limited by a shoulder 33 formed on the stem, and a plate 34 bearing against an eccentric lever 35 rotatably carried by the stem adjacent its outer end. When applied in position, the jaw of the stem engages the shank of the screws, while the plate 32 bears against the inturned flat faces 25. The lever is then turned about its eccentric pivot until the desired pressure is placed on the glass when the screws 14 and 15 are tightened down to hold the members in adjusted relation.

It will be appreciated that, while there is a certain resiliency in the inner glass holding members, there is a decided advantage in providing a resilient connection between these members and the outer member. The stresses set up by vibration and sudden shocks are dampened and absorbed much more readily than if this connection were rigid.

From the foregoing description of the division bar shown in Fig. 1, the construction of the corner bars shown in Figs. 2 and 8 is apparent. The construction of the outer members is the same except for the fact that the glass contacting surfaces are at right angles to one another instead of in the same plane. The inner members differ slightly in configuration for the reason that in the form shown in Fig. 8 the resiliency of the inner member is multiplied by providing glass contacting surfaces turned inwardly instead of outwardly. The reverse curve thus formed provides two axes of flexure instead of one provided by the form shown in Fig. 2. These devices being substantially the same, the same reference characters are used to designate like parts in all of them.

Figs. 6 and 7 disclose a modified form of bar, which in Fig. 6 is adapted to hold two panes of glass which are horizontally spaced in the same plane, while the bar as disclosed in Fig. 7 is adapted to hold two panes of glass in the same plane but spaced vertically from each other, this latter form being known as a transom bar.

Referring to Fig. 6, it will be seen that the outer glass holding member and the connecting means are substantially the same as the corresponding parts in Figure 1. However, the inner members in this instance include similar oppositely disposed heavy frame sections 50 shaped to engage the connecting plates similarly to the device previously described. The inner ends of the sections 50 are bent inwardly to form legs 51 and 52 which are adapted to be brought into holding engagement with the connecting plates 9 and 10 by suitable clamping means such as bolts 53 and nuts 54. In this manner, additional support for the inner members is provided. Instead of forming the glass engaging faces from this same piece, this modification proposes the addition of separate members for this purpose. The glass engaging members in this instance comprise plates 55 rigidly fixed to the sections 50 as by rivets 56. The plates 55 terminate in U-shaped ends 57, the free end of the U being adapted to contact the glass.

In the transom bar shown, the structure is identical to the division bar above described and shown in Fig. 6, and in addition thereto includes an inverted U-shaped member 70 adapted to seat on the connecting plate 9 and support the glass. A resilient pad 71 of leather or similar substance is interposed between the glass and its support so as to decrease the liability of breakage and to afford a vibration-absorbing support.

Obviously the setting of glass in the two forms just described includes exactly the same operations as have been previously outlined, and the tool required to put holding pressure on the glass is the same.

Although I have shown and described several modifications of the application of my invention, I wish it understood that numerous other modifications and changes may be made in the form and disposition of the parts without departing from the spirit of the invention as defined by the appended claims.

What I claim is:—

1. A plate glass holder comprising an outer glass holding member having lateral flanges for engaging the outer faces of adjacent plates of glass and having an outwardly offset central portion, inwardly extending flanges disposed behind said central portion, a resilient bracket having parts engaging said last named flanges and having a stem portion extending between said plates of glass, said engaging parts being disposed in a plane at right angles to said stem, connecting plates fixed to said bracket on opposite sides thereof and having divergent inner ends, inner glass holding means having their inner portions disposed adjacent the divergent ends of said connecting plates, said glass holding means having slots therein, and screws received in said connecting plates having their shanks extending through said slots whereby to hold the parts against relative movement.

2. A plate glass holder comprising an outer glass holding member for engaging the outer faces of adjacent plates of glass, a resilient bracket having parts engaged with said member and having a stem portion extending between said plates of glass, said engaging parts being disposed in a plane at right angles to said stem, connecting plates fixed to said bracket on opposite sides thereof and having divergent inner ends, inner glass holding means having their inner portions disposed adjacent the divergent ends of said connecting plates, said glass holding means having slots therein, and screws received in said connecting plates having their shanks extending through said slots whereby to hold the parts against relative movement.

DANIEL J. MURNANE.